United States Patent
Yamada (10) Patent No.: US 12,341,946 B2
(45) Date of Patent: Jun. 24, 2025

(54) STEREOSCOPIC IMAGE DISPLAY DEVICE

(71) Applicant: KABUSHIKI KAISHA TOSHIBA, Tokyo (JP)

(72) Inventor: Nobuhide Yamada, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 63 days.

(21) Appl. No.: 17/654,678

(22) Filed: Mar. 14, 2022

(65) Prior Publication Data
US 2023/0097546 A1 Mar. 30, 2023

(30) Foreign Application Priority Data
Sep. 24, 2021 (JP) .................. 2021-156152

(51) Int. Cl.
*H04N 13/302* (2018.01)
*G03H 1/22* (2006.01)
(Continued)

(52) U.S. Cl.
CPC ......... *H04N 13/302* (2018.05); *G03H 1/2294* (2013.01); *H04N 13/324* (2018.05); *H04N 13/398* (2018.05)

(58) Field of Classification Search
CPC ......... G09G 3/3648; G09G 2300/0426; G09G 3/003; G09G 3/3607; G02F 1/136286;
(Continued)

(56) References Cited

U.S. PATENT DOCUMENTS

2004/0160177 A1 8/2004 Uchida et al.
2013/0222384 A1 8/2013 Futterer
(Continued)

FOREIGN PATENT DOCUMENTS

JP 2-29697 A 1/1990
JP 6-233328 A 8/1994
(Continued)

OTHER PUBLICATIONS

Office Action issued Aug. 27, 2024, in corresponding Japanese Patent Application No. 2021-156152 with English translation, 5 pages.

*Primary Examiner* — Farhan Mahmud
(74) *Attorney, Agent, or Firm* — Oblon, McClelland, Maier & Neustadt, L.L.P.

(57) ABSTRACT

According to one embodiment, a stereoscopic image display device includes a three-dimensional pixel unit, a backlight, and an arithmetic/control circuit. The three-dimensional pixel unit includes a plurality of pixel cells that are formed of an optical material having electrically changeable optical characteristics, are arranged in a mutually separated manner and in a three-dimensional manner, and are electrically connected with transparent wiring patterns. The backlight is configured to emit illumination light to the three-dimensional pixel unit. The arithmetic/control circuit is configured to control the plurality of pixel cells individually via the wiring patterns on the basis of input three-dimensional image data to cause the three-dimensional pixel unit to function as a transmissive hologram.

8 Claims, 7 Drawing Sheets

(51) Int. Cl.
*H04N 13/324* (2018.01)
*H04N 13/398* (2018.01)

(58) Field of Classification Search
CPC ............. G02F 1/1368; G02F 1/136213; G02F 1/133512; G02F 1/134309; G02B 30/27; H04N 13/31; H04N 13/305; H04N 13/398; H01L 27/124

See application file for complete search history.

(56) References Cited

U.S. PATENT DOCUMENTS

| 2015/0348489 | A1* | 12/2015 | Kabe .................... G09G 3/3696 |
| | | | 345/94 |
| 2016/0042554 | A1 | 2/2016 | Ogan et al. |
| 2018/0352216 | A1 | 12/2018 | Suginohara et al. |
| 2020/0201039 | A1* | 6/2020 | Park ....................... H10K 59/50 |
| 2020/0236329 | A1 | 7/2020 | Takanashi |

FOREIGN PATENT DOCUMENTS

| JP | H11-174376 A | 7/1999 |
| JP | H11-242120 A | 9/1999 |
| JP | 2004-226736 A | 8/2004 |
| JP | 2018-132671 A | 8/2018 |
| JP | 2018-138999 A | 9/2018 |
| WO | WO 2016/121233 A1 | 8/2016 |

* cited by examiner

STEREOSCOPIC IMAGE DISPLAY DEVICE

CROSS-REFERENCE TO RELATED APPLICATIONS

This application is based upon and claims the benefit of priority from Japanese Patent Application No. 2021-156152, filed on Sep. 24, 2021, the entire contents of which are incorporated herein by reference.

FIELD

Embodiments described herein relate generally to a stereoscopic image display device.

BACKGROUND

In conventional art, known stereoscopic image display devices include hologram display devices with printed interference fringes and image display devices displaying images from multiple viewpoints by combining a flat display and a lenticular lens.

However, conventional technologies have problems, such as discrete viewpoints, limited viewing angles, and the inability to display moving images.

The present disclosure has been made in consideration of the above, and aims to provide a stereoscopic image display device having a less limited viewing angle, enabling a view from any direction, and enabling display of moving images.

DETAILED DESCRIPTION

According to one embodiment, a stereoscopic image display device includes a three-dimensional pixel unit, a backlight, and an arithmetic/control circuit. The three-dimensional pixel unit includes a plurality of pixel cells that are formed of an optical material having electrically changeable optical characteristics, are arranged in a three-dimensional manner, and are electrically connected with transparent wiring patterns. The backlight is configured to emit illumination light to the three-dimensional pixel unit. The arithmetic/control circuit is configured to control the plurality of pixel cells individually via the wiring patterns on a basis of input three-dimensional image data to cause the three-dimensional pixel unit to function as a transmissive hologram.

The following is an explanation of an embodiment with reference to the drawings.

Figure 1:
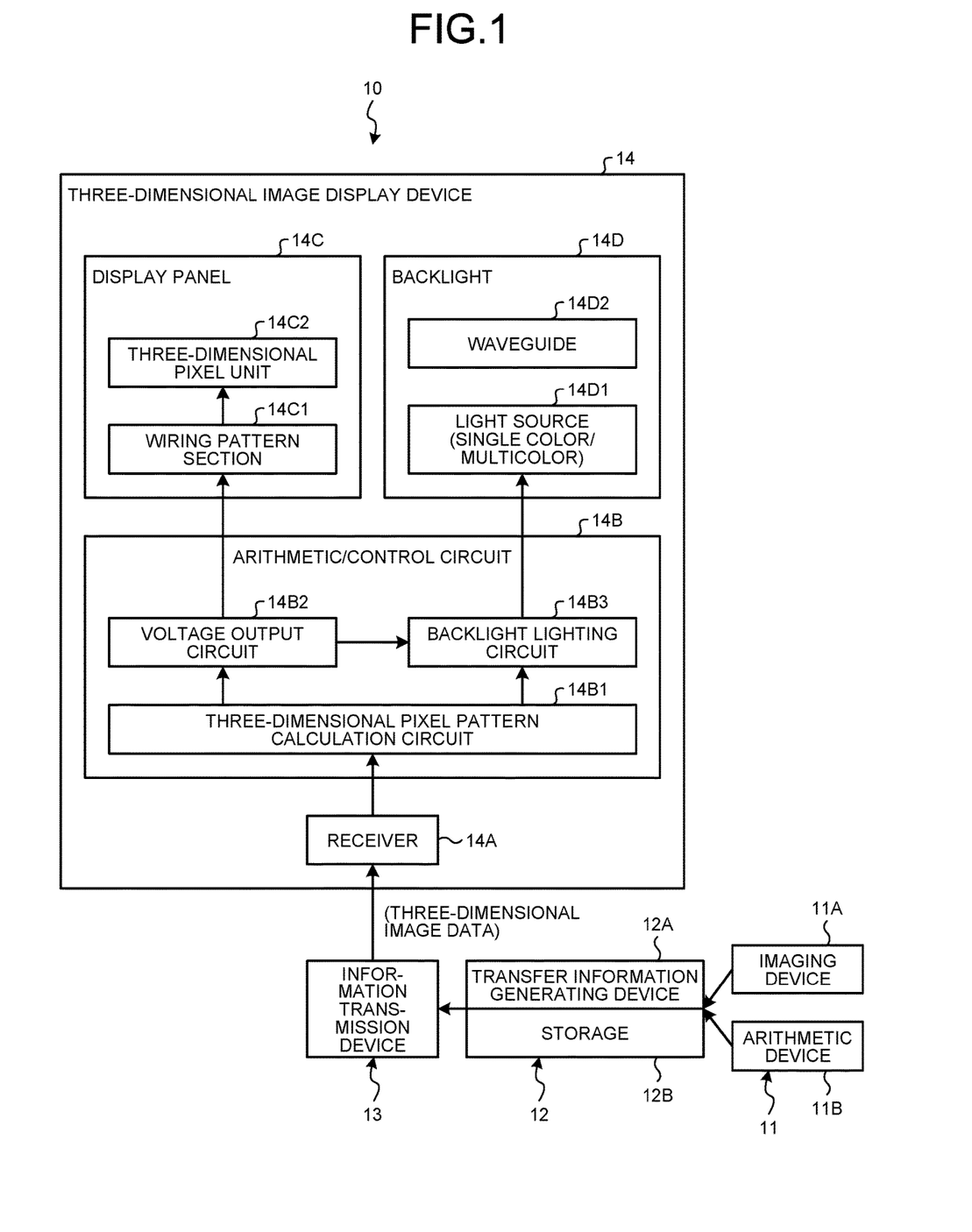
FIG. 1 is a schematic block diagram of a stereoscopic image display system.

FIG. 1 is a schematic block diagram of a stereoscopic image display system.

A stereoscopic image display system 10 includes a three-dimensional image information generator 11, a data converter 12, an information transmission device 13, and a three-dimensional image display device 14.

The three-dimensional image information generator 11 includes: an imaging device 11A that includes a time-of-flight (TOF) sensor or the like to image a subject together with the distance to each part of the subject and output the imaging data; and/or an arithmetic device 11B that generates three-dimensional image data to achieve a transmissive volume hologram for displaying three-dimensional images by performing arithmetic processing based on the imaging data and outputs the three-dimensional image data to a transfer information generating device 12A described below.

In this case, the three-dimensional image information generator 11 outputs information for ray reproduction on the screen in the three-dimensional image, assuming that a current two-dimensional image forms a screen at a certain moment by a group of (x, y, c) with information of coordinates (x, y) on the screen and color and brightness (temporarily referred to as c).

In more detail, the color and brightness (c) are shown from the pixel at (x, y) in the direction of the angle of attack (v) and the direction angle (h), and the screen at a certain moment is formed by a group of (x, y, v, h, c). In this case, it is possible to omit the information of (x, y, v, h) and transmit only the information of c, such as color and brightness, when the rules for the transmission order are decided in advance.

Here, volume holograms form interference fringes as a distribution of optical information, such as a refractive index, a polarization plane, a phase, and transmittance inside the material.

The data converter 12 includes a transfer information generating device 12A and a storage 12B, such as a hard disk drive device, and stores therein three-dimensional image data input to the storage 12B. The transfer information generating device 12A uses the storage 12B to convert the three-dimensional image data into a format that can be transferred via a communication network or broadcasting wave, and outputs the three-dimensional image data for transfer to the information transmission device 13.

The information transmission device 13 is configured as a server distributing three-dimensional image data for transfer to three-dimensional image display devices via a communication network or as a broadcasting device transmitting three-dimensional image data for transfer to three-dimensional image display devices via broadcast waves.

The three-dimensional image display device 14 includes a receiver 14A receiving three-dimensional image data for transfer from the information transmission device 13, an arithmetic/control circuit 14B performing arithmetic processing on the received three-dimensional image data for transfer, calculating three-dimensional pixel patterns, and controlling the entire three-dimensional image display device, a display panel 14C having a three-dimensional structure functioning as a transmissive volume hologram on the basis of three-dimensional image data under the control of the arithmetic/control circuit 14B, and a backlight 14D irradiating illumination light from a back surface of the display panel 14C under the control of the arithmetic/control circuit 14B.

In the configuration described above, the arithmetic/control circuit 14B includes a three-dimensional pixel pattern calculation circuit 14B1 calculating and outputting the three-dimensional pixel pattern data in the display panel 14C on the basis of the three-dimensional image data, a voltage output circuit 14B2 receiving the three-dimensional pixel pattern data and outputting a voltage signal to cause each of pixels in the display panel 14C to execute an operation corresponding to the three-dimensional pixel pattern data, and a backlight lighting circuit 14B3 controlling a waveguide and a light source forming the backlight 14D on the basis of the voltage signal output of the voltage output circuit 14B2 and the three-dimensional pixel pattern.

In the configuration described above, the three-dimensional pixel pattern calculation circuit 14B1 calculates three-dimensional pixel pattern data more suitable for each of display devices (displays) in accordance with the configurations (number of pixels, number of pixel stacks) of the display devices such as the display panel 14C.

The display panel 14C includes a wiring pattern section 14C1 transmitting voltage signals, and a three-dimensional pixel unit 14C2 connected to the wiring pattern section 14C1 and formed of optical material functioning as interference fringes.

The backlight 14D includes a single-color or multi-color light source 14D1 emitting illumination light to be applied to the display panel 14C, and a waveguide 14D2 guiding the illumination light emitted by the light source 14D1 to the display panel 14C.

Here, the following is an explanation of a configuration of the three-dimensional pixel unit 14C2 forming the display panel 14C.

Figure 2:
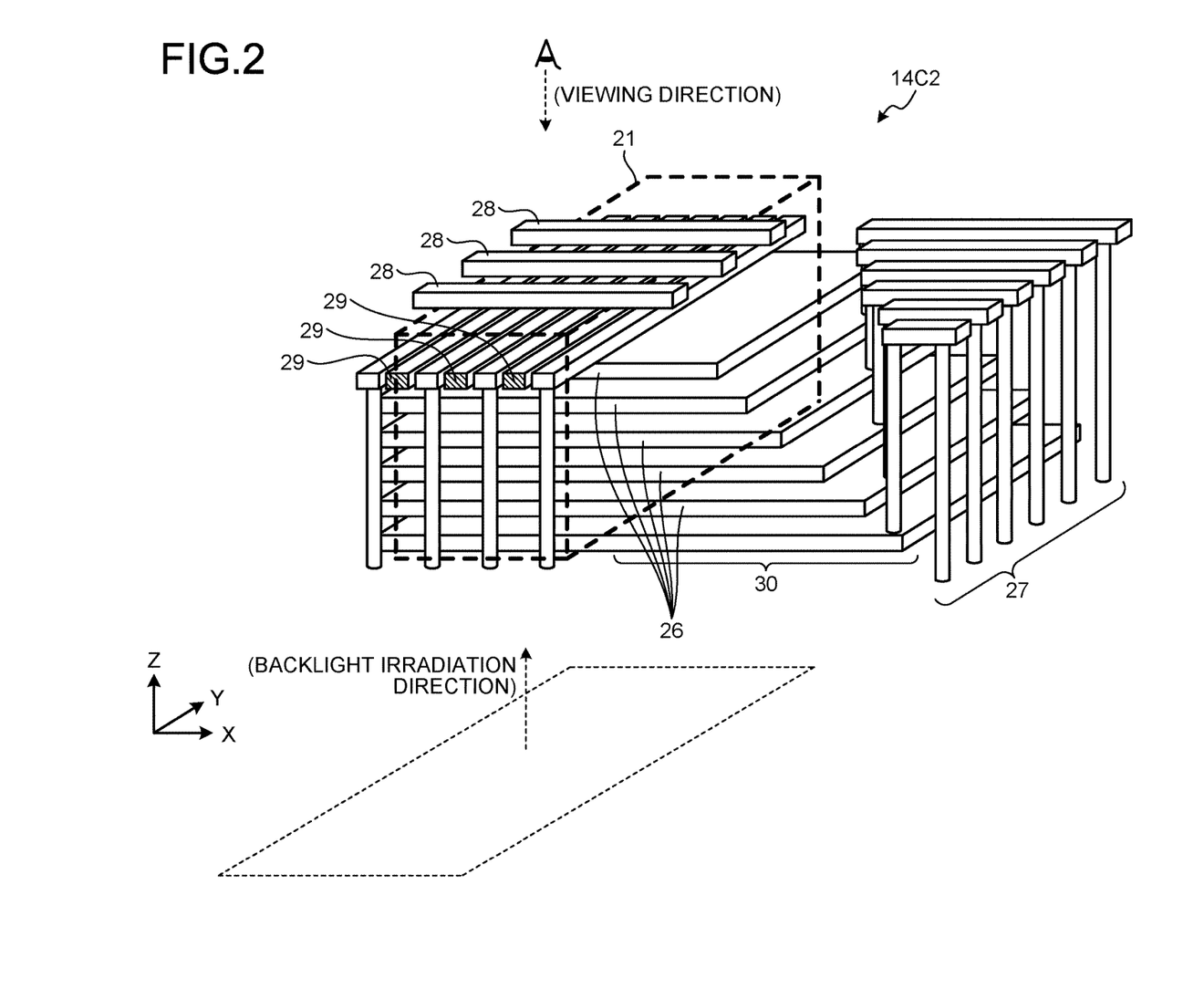
FIG. 2 is a schematic perspective view of an example of the structure of a three-dimensional pixel unit.

FIG. 2 is a schematic perspective view of an example of the structure of the three-dimensional pixel unit.

The three-dimensional pixel unit 14C2 includes a display pixel unit 21, Z-direction pixel selection lines 26, wires 27, X-direction pixel selection lines 28, central electrodes 29, and a wiring connection part 30 for connecting the wires 27.

In the following description, the extending direction of wiring of the central electrodes 29 is the Y direction, the direction of stacking pixels is the Z direction, and the direction perpendicular to the Y and Z directions is the X direction.

The display pixel unit 21 includes a plurality of pixels arranged in a three-dimensional manner, and the optical material forming each of the pixels is a material capable of changing its refractive index or transmittance according to the state of voltage application.

In this case, the optical characteristics of each of the pixels, such as refractive index and transmittance, are changed by application of a drive voltage between a central electrode extending in the Z direction and selected with a transistor serving as a switching element and a horizontal plate electrode selected with a transistor serving as a switching element, as described below.

In this case, the transistor serving as a switching element is placed on a top surface (+Z direction surface) or a bottom surface (−Z direction surface) of the display pixel unit 21 of the three-dimensional pixel unit 14C2.

In this case, a channel is located between the X-direction pixel selection line 28 connected to the gate of each transistor and the central electrode 29 connected to the drain of each transistor.

In addition, a thin gate insulating film is placed between the channel and the X-direction pixel selection line 28, and the structure is insulated.

As a result, by applying a drive voltage to the X-direction pixel selection line 28 corresponding to one of the gates and the central electrode 29 corresponding to one of the drains, the channel located at the position in which the X-direction pixel selection line 28 is orthogonal to the central electrode 29 opens, and the drain voltage is transmitted only to the corresponding pixel string described below. At the same time, by selecting one Z-direction pixel selection line 26 and applying a voltage to it, the optical characteristics, such as refractive index and transmittance, of only the corresponding pixel are changed.

Specifically, an optical material is formed of an electrochromic material represented by liquid crystal or electrooptical polymers and the like.

Electrochromic materials are substances optical characteristics of which, such as refractive index, light transmittance, and polarization plane, are changed according to voltage or electric current.

The electrochromic materials include inorganic electrochromic materials and organic electrochromic materials.

Examples of inorganic electrochromic materials include tungsten oxide ($WO_3$). Examples of organic electrochromic materials include methyl viologen and tetrathiafulvalene.

Each of the Z-direction pixel selection lines 26 connects pixels having the same Z-direction position as that of pixels existing in a predetermined range to a pixel drive power supply via a switching element.

In addition, each of the central electrodes 29 connects pixels having the same Y-direction position as that of pixels existing in a predetermined range to the pixel drive power supply via a switching element.

In the configuration described above, a drive circuit (not illustrated) is connected to each of the Z-direction pixel selection lines 26 formed of transparent optical material, and the applied voltage is controlled by the drive circuit.

The Z-direction pixel selection lines 26 of the display pixel unit 21 have a staircase-shaped structure.

As a result, optical characteristics, such as refractive index and transmittance, of the optical material serving as the pixel are changed by the voltage applied with the Z-direction pixel selection line 26 in the selected state, the X-direction pixel selection line 28 in the selected state, and the central electrode 29 in the selected state.

Figure 3A:
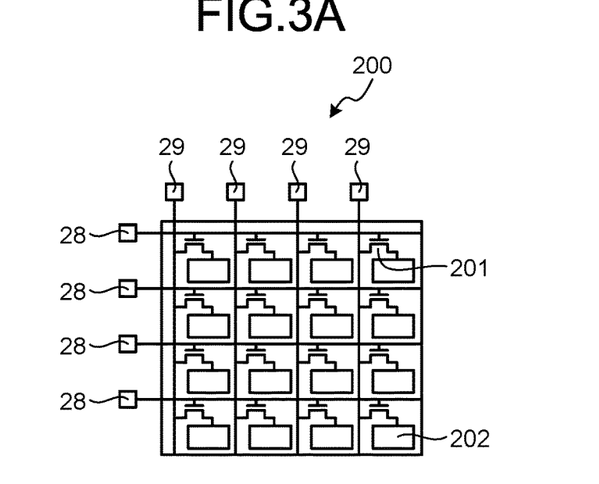
FIGS. 3A and 3B are explanatory drawings of the three-dimensional pixel unit.
Figure 3B:
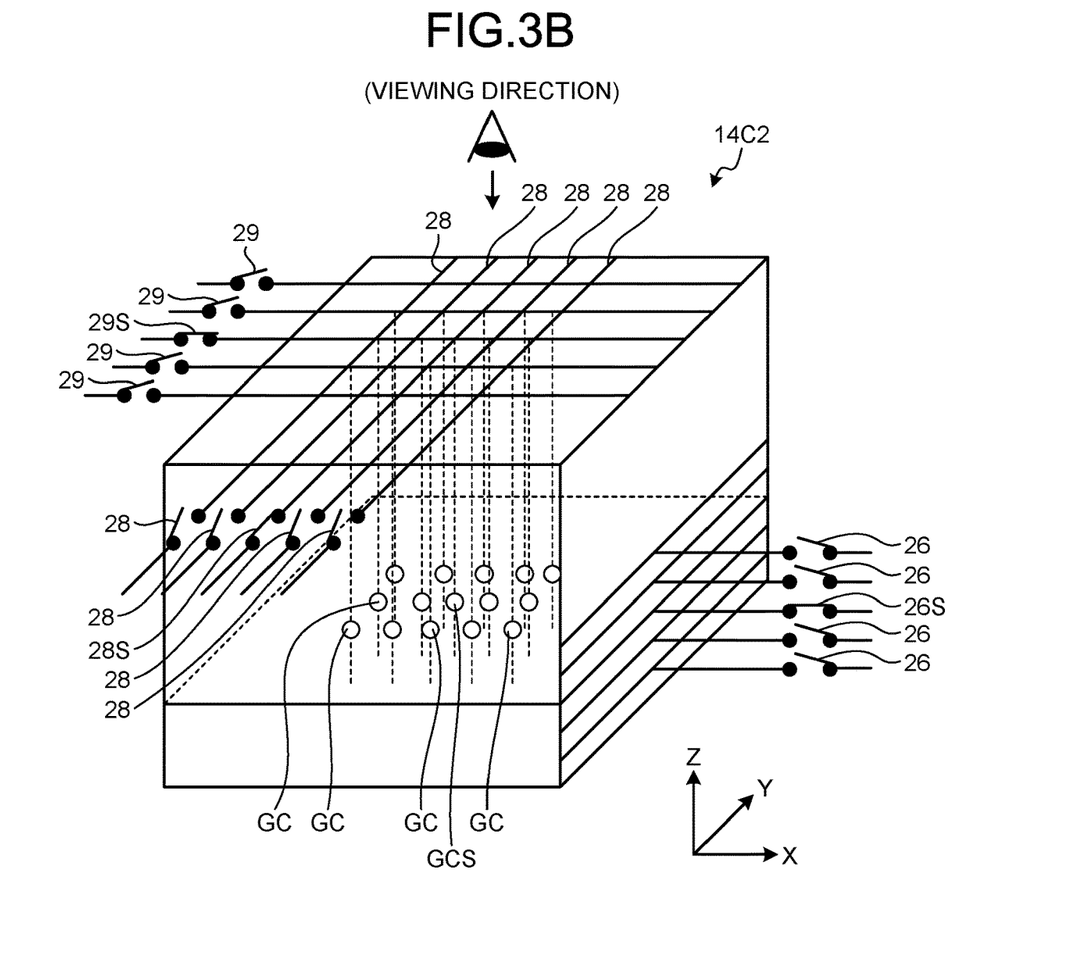

FIGS. 3A and 3B are explanatory drawings of the three-dimensional pixel unit.

FIG. 3A is an explanatory drawing of an example of an X-Y direction pixel selection circuit 200.

The X-Y direction pixel selection circuit includes a TFT 201 for each of the pixels. Each TFT 201 includes a gate terminal connected to the X-direction pixel selection line 28, a drain terminal connected to the central electrode 29, and a source terminal connected to a pixel electrode 202.

As a result, a pixel string GS located at the intersection of the X-direction pixel selection line 28 and central electrode 29 in the selected state changes to the selected state.

FIG. 3B is an explanatory drawing of a selected state of a pixel cell.

As illustrated in FIG. 3B, when any of the Z-direction pixel selection lines 26 is selected, the pixel cell GC in the pixel string GS in the selected state is selected to execute display.

Here, the term "display" means that the color and brightness (c) are shown from the surface of the three-dimensional pixel unit 14C2 in the direction of the angle of attack (v) and direction angle (h) by the action of the selected pixel cell GC serving as the pixel at coordinates (x, y), as described above.

In addition, as illustrated in FIG. 3B, by turning on the selection switches corresponding to the Z-direction pixel selection line 26, the X-direction pixel selection line 28, and the central electrode 29 to be selected, it is possible to set the lines as the selected Z-direction pixel selection line 26S, the selected X-direction pixel selection line 28S, and the selected central electrode 29S, and set one pixel cell GC as a selected pixel cell GCS.

The explanation above illustrates the case where the pixel cell GC is switched between a transparent state and an opaque state, but it is also possible to express intermediate tones by changing the voltage applied to the pixel cell GC. For example, when an electrochromic material capable of changing the light transmittance is used as the electrochromic material of the pixel cell GC, the transmittance can be controlled in each pixel cell.

When an electrochromic material with a changeable refractive index is used as the electrochromic material in the pixel cell GC, the refractive index can be controlled in each pixel cell. When a material enabling change of a polarization plane is used as the electrochromic material in the pixel cell GC, the polarization plane can be controlled in each pixel cell.

Figure 4:
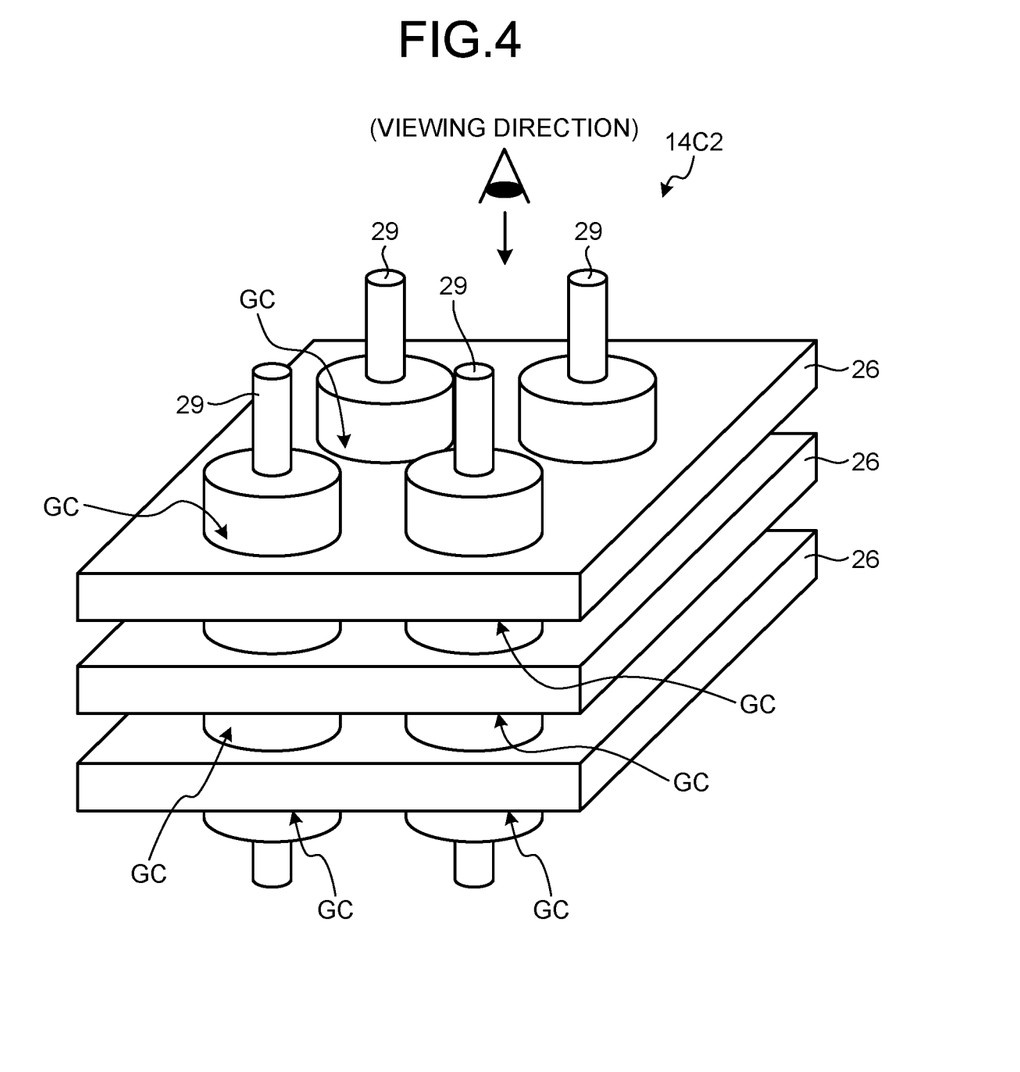
FIG. 4 is a conceptual explanatory drawing of a configuration example of a pixel cell.

FIG. 4 is an explanatory drawing of a configuration example of a pixel cell.

In FIG. 4, a transparent insulating film (not illustrated) shall be provided between the Z-direction pixel selection lines 26 functioning as opposed conductive films.

Each of pixel cells GC is formed in a position in which the central electrode 29 faces the Z-direction pixel selection line 26 (in the Z-direction pixel selection line 26) such that the pixel cells GC can be controlled individually.

Figure 8:
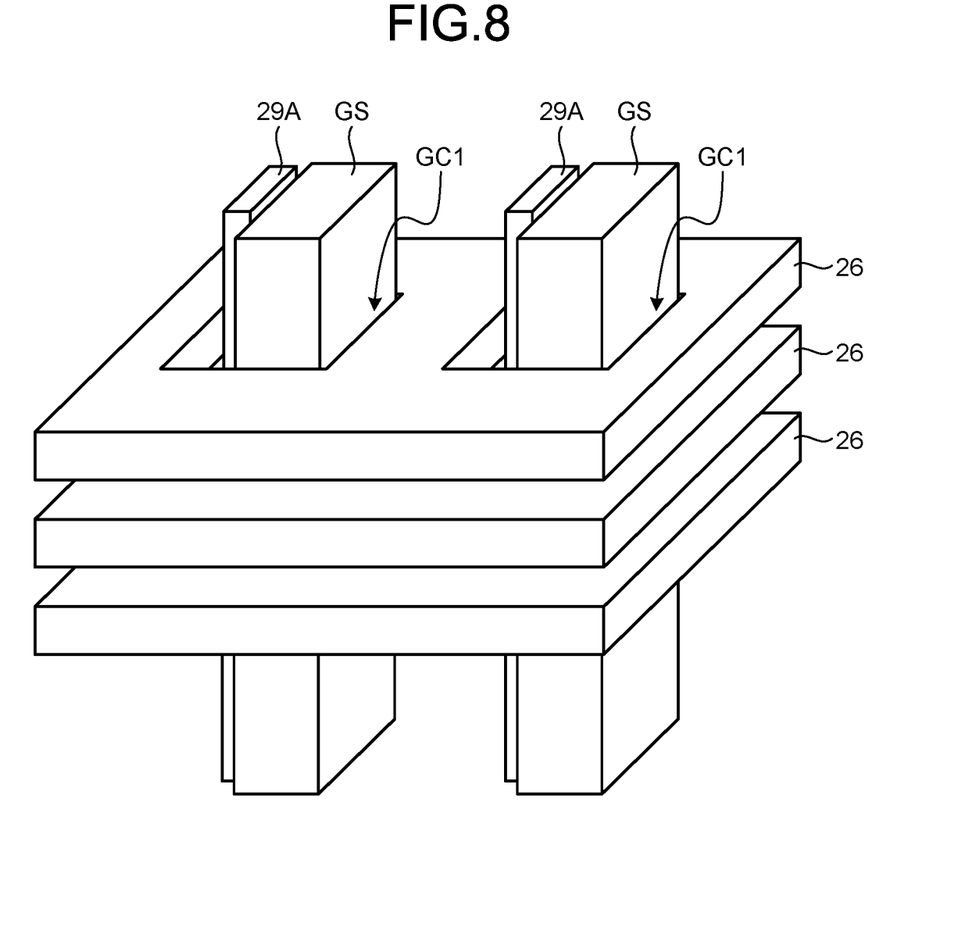
FIG. 8 is a conceptual explanatory drawing of another configuration example of the pixel cell.

In other words, pixel cells GC are arranged along the vertical direction of FIG. 8 for every distance between the opposed Z-direction pixel selection lines 26.

In other words, the three-dimensional pixel unit 14C2 includes cylindrical optical materials, central electrodes 29 functioning as first lines extending in openings of the optical materials, and a laminate formed by alternately stacking the Z-direction pixel selection lines 26 serving as conductive films and insulating films (not illustrated), and the optical materials and the central electrodes 29 functioning as the first lines are integrally arranged to penetrate the laminate along the stacking direction.

The following is an explanation of an example of the relationship between the applied voltage and the light transmittance when an electrochromic material with varying light transmittance is used as the optical material.

Figure 5:
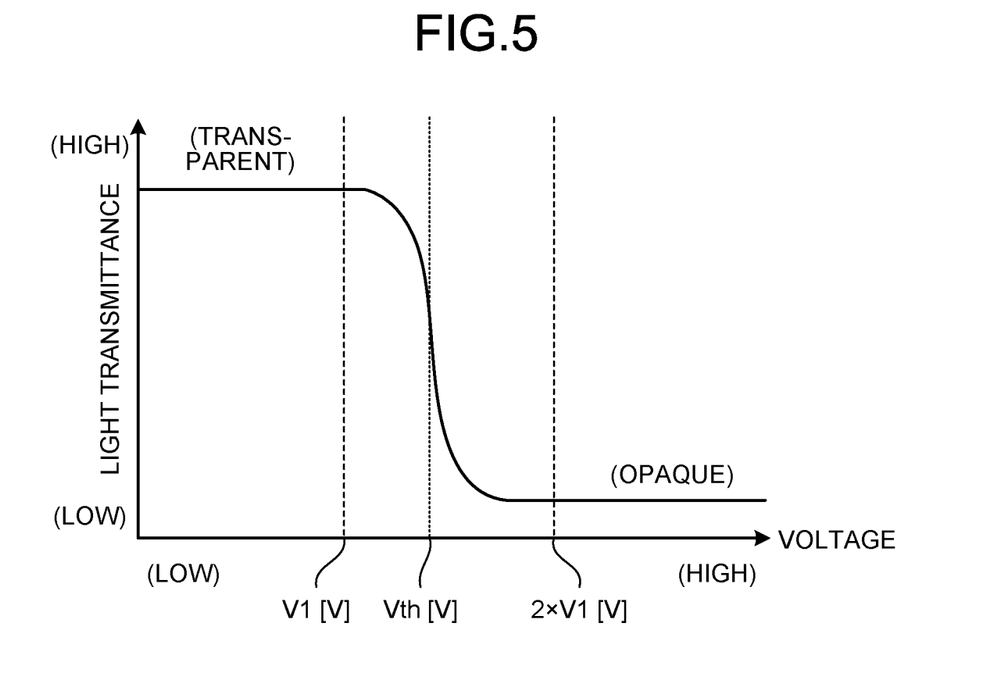
FIG. 5 is an explanatory drawing of an example of the relationship between applied voltage and light transmittance for an optical material.

FIG. 5 is an explanatory drawing of an example of the relationship between applied voltage and light transmittance for the optical material.

In the example of FIG. 5, an (transparent) optical material having high light transmittance when no voltage is applied (applied voltage is 0 [V]) is used.

Here, the voltage Vth is a voltage at which the light transmittance changes significantly.

The voltage V1 [V] is set to a voltage with which sufficiently high light transmittance can be maintained.

When a voltage V1×2 [V] being twice as high as the voltage V1 is applied, the voltage is certainly higher than the reaction threshold voltage Vth and the light transmittance is substantially fixed in a low state.

For this reason, this is used to control changes in the optical characteristics of pixel cells.

Figure 6:
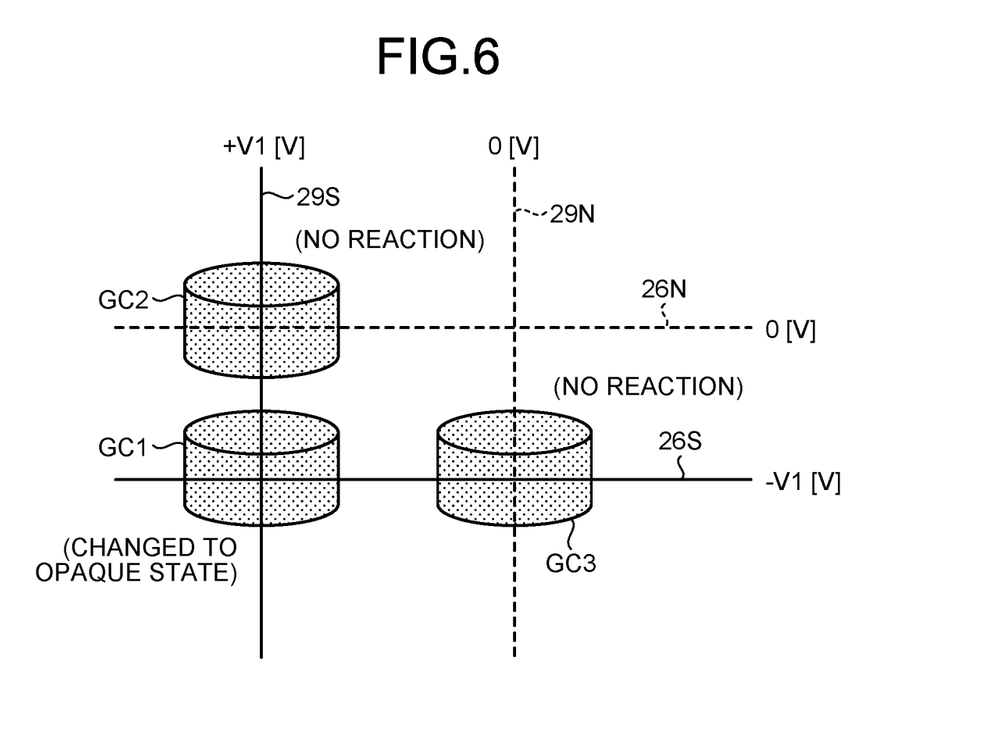
FIG. 6 is an explanatory drawing of a method for changing an optical characteristic of a pixel cell.

FIG. 6 is an explanatory drawing of a method for changing an optical characteristic of a pixel cell.

For a certain pixel cell GC, the voltage +V1 [V] shall be applied to the central electrode 29S to be selected. In addition, a voltage of 0 [V] shall be applied to the central electrode 29N not to be selected.

Similarly, the voltage −V1 shall be applied to the Z-direction pixel selection line 26S to be selected. The voltage 0 [V] shall be applied to the Z-direction pixel selection line 26N not to be selected.

As a result, a voltage V1×2 [V] being effectively twice as high as the voltage V1 is applied to the pixel cell GC1 located at the intersection of the central electrode 29S to be selected and the Z-direction pixel selection line 26S to be selected, and the pixel cell GC1 becomes opaque.

By contrast, a voltage V1 [V] is effectively applied to the pixel cell GC2 located at the intersection of the central electrode 29S to be selected and the Z-direction pixel selection line 26N not to be selected, but the pixel cell GC2 does not react and remains in a transparent state.

Similarly, although the voltage V1 [V] is effectively applied to the pixel cell GC3 located at the intersection of the central electrode 29N not to be selected and the Z-direction pixel selection line 26S to be selected, the pixel cell GC3 does not react and remains in the transparent state.

Figure 7:
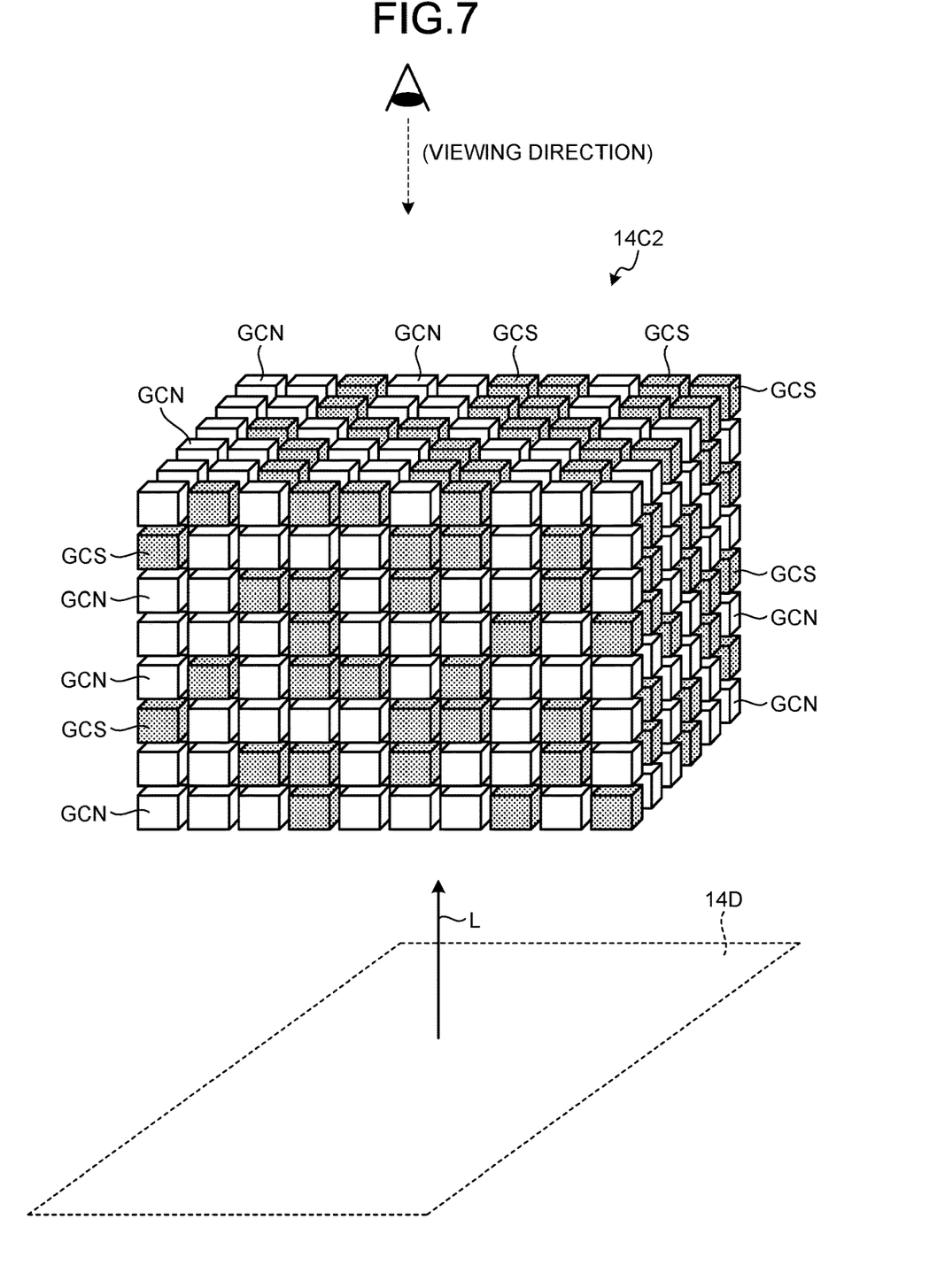
FIG. 7 is an explanatory drawing of an example of a control state of the three-dimensional pixel unit.

FIG. 7 is an explanatory drawing of an example of a control state of the three-dimensional pixel unit.

As illustrated in FIG. 7, the three-dimensional pixel unit 14C2 has opaque selected pixel cells GCS and transparent non-selected pixel cells GCN arranged in a three-dimensional manner.

As a result, when the illumination light L emitted from the backlight 14D passes through the three-dimensional pixel unit 14C2, the three-dimensional pixel unit 14C2 functions as a transmissive hologram display device and can display ray-reproducing stereoscopic images corresponding to multiple viewpoints.

In this case, the three-dimensional pixel unit 14C2 functions as an interference fringe volume type unit, and the interference fringes can be realized as refractive index distribution or transmittance distribution inside the material.

In addition, because the optical material or optical path control element and its control wires are arranged in a three-dimensional manner, dynamically changeable interference fringes can be formed.

Accordingly, it is also possible to display holograms of moving images.

As explained above, in the three-dimensional image display device according to the present embodiment, the optical material or optical path control element and its control wires are arranged in a manner similar to the charge storage material and wires in a three-dimensional memory, making it possible to manufacture the structure using multilayer deposition and microfabrication.

This structure enables manufacturing of popular naked-eye stereoscopic displays that can be mass-produced.

In the above description, the light source 14D1 has not been described in detail, but it is also possible to configure the system to display color images by installing a plurality of color light sources and reproducing the stereoscopic images corresponding to the respective color light sources in a time-division manner.

The above explanation illustrates the case where the three-dimensional pixel unit 14C2 is provided, but it is also possible to display the same kind of image as that of a conventional transmission hologram device even with only one layer.

FIG. 8 is a conceptual explanatory drawing of another configuration example of the pixel cell.

In FIG. 8, a transparent insulating film (not illustrated) shall be provided between the opposed Z-direction pixel selection lines 26 and between the central electrode 29A and the opposed Z-direction pixel selection line 26.

Each of pixel cells GC is formed in a position in which the central electrode 29A faces the Z-direction pixel selection line 26 (in the Z-direction pixel selection line 26) such that the pixel cells GC can be controlled individually.

In other words, pixel cells GC are arranged along the vertical direction of FIG. 8 for every distance between the opposed Z-direction pixel selection lines 26.

In other words, the three-dimensional pixel unit 14C2 includes plate-like optical materials, central electrodes 29A functioning as first lines extending in the extending direction of the optical materials to electrically contact the optical materials, and a laminate formed by alternately stacking the Z-direction pixel selection lines 26 serving as conductive films and insulating films (not illustrated), and the optical materials and the central electrodes 29A functioning as the first lines are integrally arranged to penetrate the laminate along the stacking direction in a state in which the central electrodes 29A functioning as the first lines are insulated from the Z-direction pixel selection lines 26 serving as conductive films.

This structure also enables display of stereoscopic images in the same manner as the structure illustrated in FIG. 4.

The arithmetic/control circuit 14B according to the present embodiment has a hardware configuration using an ordinary computer, and includes a control unit, such as a central processing unit (CPU), a high-speed arithmetic unit capable of executing image processing, such as a graphics processing unit (GPU), and a storage unit such as a read only memory (ROM) and a random access memory (RAM). It may also include an external storage device, such as a solid-state drive (SSD), a hard disk drive (HDD), or the like as needed.

The computer program to be executed by the arithmetic/control circuit 14B according to the present embodiment is provided as a file in an installable or executable format file recorded on a computer-readable recording medium, such as an SSD, a semiconductor storage device such as a universal serial bus (USB) memory, a digital versatile disc (DVD), and the like.

The computer program to be executed by the arithmetic/control circuit 14B according to the present embodiment may be configured to be stored on a computer connected to a network, such as the Internet, and provided by having it downloaded via the network. The computer program to be executed by the arithmetic/control circuit 14B according to the present embodiment may be configured to be provided or distributed via a network, such as the Internet.

The computer program of the arithmetic/control circuit 14B according to the present embodiment may be configured to be provided in a ROM or other media in advance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A stereoscopic image display device, comprising:
a three-dimensional pixel unit including a plurality of pixel cells arranged in a three-dimensional array, and including X-direction pixel selection lines, Y-direction pixel selection lines, and Z-direction pixel-layer selection lines, the plurality of pixel cells being formed of an optical material having electrically changeable optical characteristics, being arranged in a three-dimensional manner, and being electrically connected with transparent wiring patterns;
a backlight configured to emit illumination light to the three-dimensional pixel unit; and
an arithmetic/control circuit configured to:
select pixel cells of the plurality of pixel cells via the wiring patterns based on input three-dimensional image data, by individually controlling the X-direction pixel selection lines, the Y-direction pixel selection lines, and the Z-direction pixel-layer selection lines;
generate a three-dimensional image using the selected pixel cells in the three-dimensional pixel unit to visualize the three-dimensional image from a surface of the three-dimensional pixel unit by changing a refractive index or a transmittance of the selected pixel cells according to a state of voltage application to the selected pixel cells; and
cause the three-dimensional pixel unit to function as a transmissive hologram.

2. The stereoscopic image display device according to claim 1, wherein the three-dimensional pixel unit is formed by stacking a plurality of layers of pixel cells arranged in a two-dimensional manner, with insulating films interposed between the layers.

3. The stereoscopic image display device according to claim 1, wherein
the three-dimensional pixel unit includes a cylindrical optical material, a first line extending in an opening of the optical material, and a laminate formed by alternately stacking conductive films and insulating films, and
the optical material and the first line are integrally arranged to penetrate the laminate along a stacking direction.

4. The stereoscopic image display device according to claim 1, wherein
the three-dimensional pixel unit includes the optical material extending in a predetermined direction, a first line extending in an extending direction of the optical material to electrically contact the optical material, and a laminate formed by alternately stacking conductive films and insulating films, and
the optical material and the first line are integrally arranged to penetrate the laminate along a stacking direction in a state where the first line is insulated from the conductive films.

5. The stereoscopic image display device according to claim 1, wherein the optical material includes an electrochromic material represented by liquid crystal, electro-optical polymers, or other materials.

6. The stereoscopic image display device according to claim 1, wherein the arithmetic/control circuit includes:
a three-dimensional pixel pattern calculation circuit configured to calculate and output three-dimensional pixel pattern data in the three-dimensional pixel unit based on the three-dimensional image data; and a voltage output circuit configured to receive the three-dimensional pixel pattern data and output a voltage signal to cause each of pixels in the three-dimensional pixel unit to perform an operation corresponding to the three-dimensional pixel pattern data.

7. The stereoscopic image display device according to claim 1, wherein
the backlight includes light sources of a plurality of colors, and
the arithmetic/control circuit is further configured to reproduce stereoscopic images corresponding to the respective light sources in a time-division manner to display color images.

8. A stereoscopic image display device, comprising:
a three-dimensional pixel unit including a plurality of pixel cells arranged in a three-dimensional array, and including X-direction pixel selection lines, Y-direction pixel selection lines, and Z-direction pixel-layer selection lines, the plurality of pixel cells being formed of an optical material having electrically changeable optical characteristics, being arranged in a three-dimensional manner, and being electrically connected with transparent wiring patterns;
a backlight configured to emit illumination light to the three-dimensional pixel unit; and
an arithmetic/control circuit configured to
select pixel cells of the plurality of pixel cells arranged in the three-dimensional manner via the wiring patterns based on input three-dimensional image data, by individually controlling the X-direction pixel selection lines, the Y-direction pixel selection lines, and the Z-direction pixel-layer selection lines;
make, among the plurality of pixel cells, the selected pixel cells be opaque and unselected pixel cells be transparent, and generate a three-dimensional image using the selected pixel cells in the three-dimensional pixel unit to visualize the three-dimensional image from a surface of the three-dimensional pixel unit by changing transmittance of the selected pixel cells according to a state of voltage application to the selected pixel cells; and
cause the three-dimensional pixel unit to function as a transmissive hologram.

* * * * *